US011709822B2

(12) United States Patent
Vankamamidi et al.

(10) Patent No.: US 11,709,822 B2
(45) Date of Patent: Jul. 25, 2023

(54) MANAGING DATAPATH VALIDATION ON PER-TRANSACTION BASIS

(71) Applicant: EMC IP Holding Company LLC, Hopkinton, MA (US)

(72) Inventors: Vamsi K. Vankamamidi, Hopkinton, MA (US); Geng Han, Beijing (CN); Xinlei Xu, Beijing (CN); Philippe Armangau, Acton, MA (US); Vikram Prabhakar, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 587 days.

(21) Appl. No.: 16/887,697

(22) Filed: May 29, 2020

(65) Prior Publication Data

US 2021/0374126 A1 Dec. 2, 2021

(51) Int. Cl.
*G06F 16/23* (2019.01)
*G06F 12/121* (2016.01)
*G06F 11/14* (2006.01)
*G06F 16/18* (2019.01)

(52) U.S. Cl.
CPC ...... *G06F 16/2379* (2019.01); *G06F 11/1423* (2013.01); *G06F 12/121* (2013.01); *G06F 16/1865* (2019.01); *G06F 2212/608* (2013.01)

(58) Field of Classification Search
CPC ............ G06F 16/2379; G06F 16/1865; G06F 11/1423; G06F 12/121; G06F 2212/608
See application file for complete search history.

(56) References Cited

U.S. PATENT DOCUMENTS

| 7,062,675 | B1 * | 6/2006 | Kemeny | G06F 11/1441 |
| | | | | 711/138 |
| 9,135,123 | B1 * | 9/2015 | Armangau | G06F 16/172 |
| 9,170,947 | B2 * | 10/2015 | Vera | G06F 12/0817 |
| 9,280,578 | B1 | 3/2016 | Zhou et al. | |
| 9,779,105 | B1 | 10/2017 | Bono et al. | |
| 9,916,191 | B1 | 3/2018 | Pan et al. | |
| 9,916,244 | B1 | 3/2018 | Tolvanen et al. | |
| 2013/0019048 | A1 * | 1/2013 | Bland | G06F 9/3824 |
| | | | | 711/E12.008 |

(Continued)

FOREIGN PATENT DOCUMENTS

WO   WO-2019022632 A1 *   1/2019   ......... G06F 12/0868

OTHER PUBLICATIONS

"Disk buffer—Wikipedia"; dated May 12, 2020; downloaded from Wikipedia.org at https://en.wikipedia.org/w/index.php?title=Disk_buffer&oldid=956217086; 5 pages.

*Primary Examiner* — Mahesh H Dwivedi
(74) *Attorney, Agent, or Firm* — BAINWOODHUANG (57) ABSTRACT

A technique for managing a datapath of a data storage system includes receiving a request to access target data and creating a transaction that includes multiple datapath elements in a cache, where the datapath elements are used for accessing the target data. In response to detecting that one of the datapath elements is invalid, the technique further includes processing the transaction in a rescue mode. The rescue mode attempts to replace each invalid datapath element of the transaction with a valid version thereof obtained from elsewhere in the data storage system. The technique further includes committing the transaction as processed in the rescue mode.

20 Claims, 5 Drawing Sheets

(56) References Cited

U.S. PATENT DOCUMENTS

| | | | |
|---|---|---|---|
| 2015/0012711 A1* | 1/2015 | Garg | G06F 12/084 711/130 |
| 2017/0185519 A1* | 6/2017 | Marshall | G06F 12/0891 |
| 2017/0192892 A1* | 7/2017 | Pundir | G06F 3/0644 |

* cited by examiner

MANAGING DATAPATH VALIDATION ON PER-TRANSACTION BASIS

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Storage systems typically perform validation on datapath elements that are accessed as part of read and write operations. As is known a "datapath" is a set of elements of data or metadata that are used for accessing desired data in a storage system. For example, when a storage system receives a request to read or write a portion of target data, the storage system loads a datapath element, such as the target data itself or a page of metadata that points to the target data, and performs an error-detection check on the element. Error detection may include checksum validation and/or other forms of validation. If error detection reveals no errors, the datapath element is deemed valid and the read or write operation proceeds. Otherwise, the datapath element is deemed invalid and the storage system invokes an error handler. The error handler may report the target data as unavailable. If the invalid datapath element contains pointer metadata to multiple storage locations, the error handler may mark all such storage locations as unavailable.

SUMMARY

The above-described approach to validating datapath elements typically proceeds on a per-element basis, where each datapath element is validated individually. Unfortunately, this element-by-element approach can be insufficient. Consider, for example, a read request of a particular address, such as a particular LBA (logical block address) of a LUN (Logical UNit). Accessing the LBA may require traversing a complex datapath that includes multiple arrays of pointers, such as indirect block pointers, virtual block pointers, and other structures. Sometimes, a particular datapath element fails validation not because of any error in the element itself, but rather because of an error in an element that points to it. Checking datapath elements individually may thus misdiagnose errors, causing false-positive reports of unavailable data and/or false-negative reports of available data. What is needed is a datapath validation procedure that considers the overall datapath rather than just individual elements.

To address this need in whole or in part, an improved technique for performing datapath validation in a storage system proceeds on a per-transaction basis. If any datapath element involved in a transaction is found to be invalid, the technique retries the entire transaction in a rescue mode, in which the storage system attempts to replace all invalid datapath elements of the transaction with valid ones found elsewhere in the storage system. Advantageously, the improved technique identifies and addresses validation errors on a per-transaction basis, ensuring that datapath elements of a transaction can be validated and updated together in a consistent manner.

Certain embodiments are directed to a method of managing a datapath of a data storage system. The method includes receiving a request to access target data and creating a transaction that includes multiple datapath elements in a cache, where the datapath elements are used for accessing the target data. In response to detecting that one of the datapath elements is invalid, the method further includes processing the transaction in a rescue mode. The rescue mode attempts to replace each invalid datapath element of the transaction with a valid version thereof obtained from elsewhere in the data storage system. The method further includes committing the transaction as processed in the rescue mode.

Other embodiments are directed to a computerized apparatus constructed and arranged to perform a method of managing a datapath, such as the method described above. Still other embodiments are directed to a computer program product. The computer program product stores instructions which, when executed on control circuitry of a computerized apparatus, cause the computerized apparatus to perform a method of managing a datapath, such as the method described above.

The foregoing summary is presented for illustrative purposes to assist the reader in readily grasping example features presented herein; however, this summary is not intended to set forth required elements or to limit embodiments hereof. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing a datapath in a data storage system includes identifying multiple datapath elements needed for accessing a portion of target data. The technique creates a transaction that includes the identified datapath elements and begins performing validation on the elements of the transaction individually. In the event that validation fails for any of the identified datapath elements, the technique retries the entire transaction in a rescue mode. Rescue mode attempts to replace invalid instances of datapath elements with respective valid instances found elsewhere in the storage system. Assuming validation errors can be corrected in rescue mode, the storage system updates the identified datapath elements of the transaction as needed and commits the transaction atomically.

Figure 1:
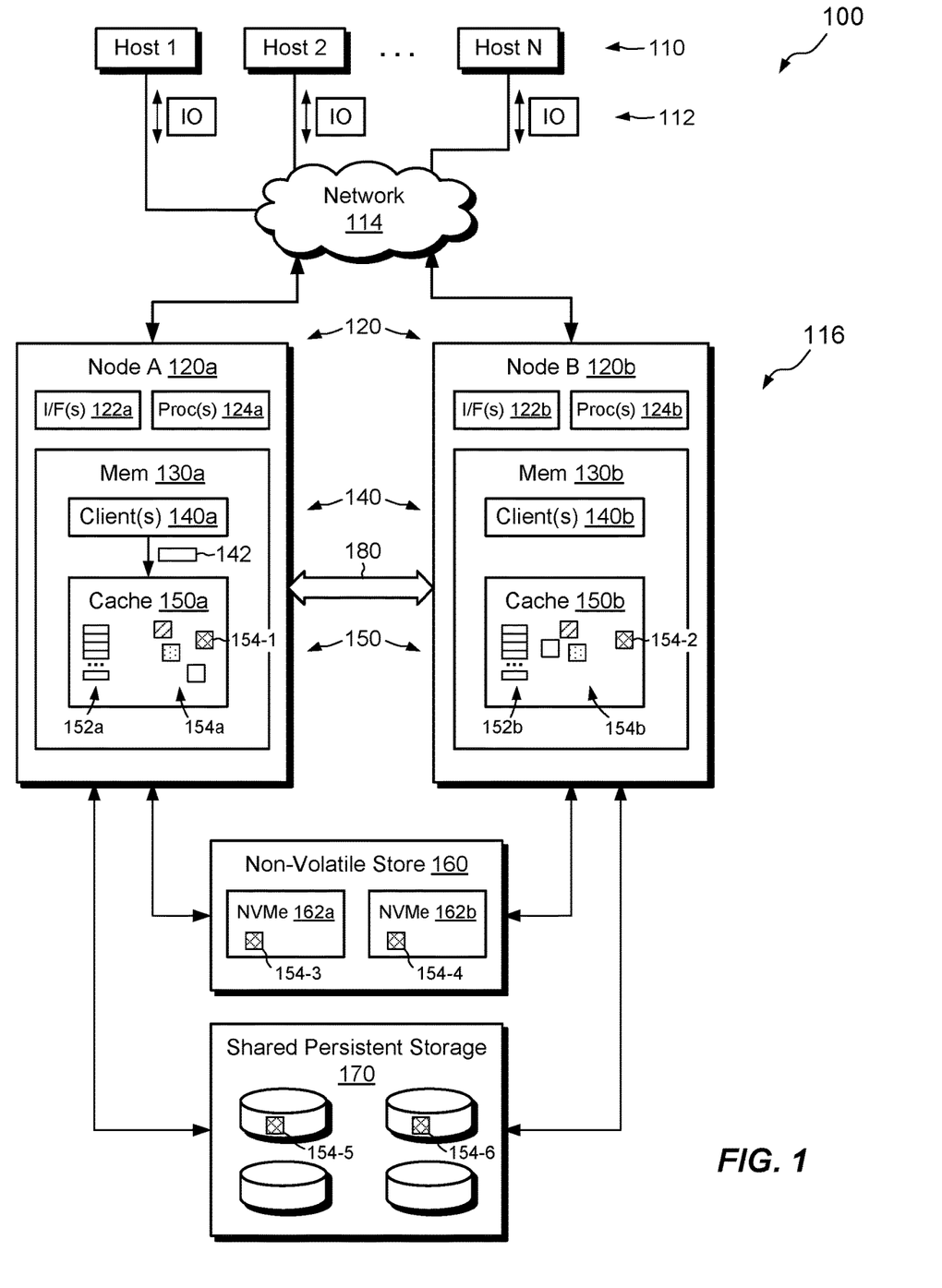
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes multiple processing nodes, such as a first node 120a (Node A) and a second node 120b (Node B), a non-volatile (NV) store 160, and persistent storage 170. The NV store 160 may include high-speed non-volatile memory (e.g., NVMe™) and may be configured in a mirrored arrangement (i.e., RAID-1, where RAID is an acronym for Redundant Array of Independent Disks). Each side 162a or 162b of the NV store 160 stores a redundant copy of contents of the other side. The persistent storage 170 may include magnetic disk drives, electronic flash drives, solid-state drives and/or the like, which may also be RAID-protected, such as by using RAID-1 (mirroring) for metadata and RAID-5 (rotating parity) for user data.

The processing nodes 120 may be provided as circuit board assemblies or blades, which plug into a chassis that encloses and cools the nodes 120. The chassis has a backplane for interconnecting the nodes 120, and additional connections may be made among nodes 120 using one or more cables 180. In some arrangements, a host application runs directly on the nodes 120, such that separate host machines 110 need not be present. One should appreciate, though, that no particular hardware configuration is required, and that any number of nodes 120 may be provided, including a single node, in any arrangement, and the node or nodes 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where separate hosts 110 are provided, such hosts 110 may connect to the nodes 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The nodes 120 are configured to receive I/O requests 112 according to block-based and/or file-based protocols and to respond to such I/O requests 112 by reading or writing the storage 170.

As further shown in FIG. 1, node 120a includes one or more communication interfaces 122a, a set of processing units 124a, and memory 130a. The communication interfaces 122a include, for example, SCSI target adapters and/or network interface adapters for converting electronic and/or optical signals received over the network 114 to electronic form for use by the node 120a. The set of processing units 124a includes one or more processing chips and/or assemblies, such as numerous multi-core CPUs (central processing units). The memory 130a includes both volatile memory, e.g., RAM (Random Access Memory), and non-volatile memory, such as one or more ROMs (Read-Only Memories), disk drives, solid state drives, or the like. The set of processing units 124a and the memory 130a together form control circuitry, which is constructed and arranged to carry out various methods and functions as described herein. Also, the memory 130a includes a variety of software constructs realized in the form of executable instructions. When the executable instructions are run by the set of processing units 124a, the set of processing units 124a is made to carry out the operations of the software constructs. Although certain software constructs are specifically shown and described, it is understood that the memory 130a typically includes many other software components, which are not shown, such as an operating system, various applications, processes, and daemons.

Node 120b may be constructed similarly to node 120a and may be equipped with its own set of communication interfaces 122b, processors 124b, and memory 130b, which are constructed to operate substantially as described in connection with the corresponding components of node 120a.

As still further shown in FIG. 1, the memory 130a "includes," i.e., realizes by execution of software instructions, one or more clients 140a and a cache 150a. Each client 140a is configured to issue access requests to the cache 150a, such as request to read and/or write data or metadata. In the example of FIG. 1, the client 140a may be implemented as a namespace manager, a mapping manager, and/or some other component that requires access to the cache 150a. Similar structures 140b and 150b may be present in the memory 130b of node 120b. Details of the namespace manager and mapper manager may be found in copending U.S. application Ser. No. 16/773,774, filed Jan. 27, 2020, and entitled "MANAGING UNCORRECTABLE USER DATA," the contents and teachings of which are incorporated by reference in their entirety.

Each cache 150 is preferably implemented in DRAM (Dynamic RAM) and may include both cache descriptors (152a or 152b) and cache pages (154a or 154b). In an example, the cache pages may be 4 kB or some other uniform size. Cache descriptors 152a or 152b provide information about respective cache pages 154a or 154b, such as their locations, whether the pages are clean or dirty, and/or other information. As is known, a cache page is "clean" if its contents match those of a corresponding page (or block) in persistent storage. Conversely, a cache page is "dirty" if its contents are more recent than those found in persistent storage.

In a particular example, the nodes 120a and 120b are configured in an active-active arrangement in which each node 120 can receive and process I/O requests 112 directed to any user data object found in the persistent storage 170, which is shared between the nodes 120. To promote efficient processing and memory usage, cache pages 154a and 154b are preferably not duplicated across nodes 120 but may instead have different contents on the respective nodes. For example, pages shown with similar shading across the two nodes 120 correspond to the same elements, although they may be different versions thereof. For instance, pages 154-1 and 154-2 may contain different versions of the same element. Pages shown without shading have no corresponding pages in the other cache. Although the data storage system 116 preferably does not maintain coherency for cache pages 154a and 154b, it preferably does maintain coherency between cache descriptors 152a and 152b, such that the cache descriptors 152a preferably match the cache descriptors 152b.

In an example, the data storage system 116 is configured to maintain separate copies of dirty cache pages in the NV store 160, which persists such pages in a mirrored arrangement. For example, data elements 154-3 and 154-4 are preferably identical to each other and correspond to the same data element as the one cached in pages 154-1 and 152-2. If page 154-1 is dirty and page 154-2 is clean, then elements 154-3 and 154-4 would both contain the same contents as dirty page 154-1. Clean pages of the caches 150 are not necessarily persisted in the NV store 160, but they may generally be found in persistent storage 170. For example, data elements 154-5 and 154-6 may contain identical contents (in a mirrored or other RAID arrangement), which match the contents of clean page 154-2.

In example operation, hosts 110 issue I/O requests 112 to the data storage system 116. Nodes 120 receives the I/O requests 112 at the respective communication interfaces and initiate further processing. The I/O requests 112 may be directed to data objects hosted by the data storage system 116, such as LUNs, file systems, virtual machine disks, and the like. I/O requests 112 may arrive at both nodes 120, with such nodes processing the I/O requests in an active-active arrangement.

When an I/O request 112 arrives at node 120a, client or clients 140a perform processing for responding to the request. For example, a namespace manager may form a transaction 142 for writing user data. Likewise, a mapper manager form a transaction 142 for writing metadata.

The transactions 142 formed by clients 140a each typically include all data or metadata elements needed for satisfying the I/O request 112. Generally, separate transactions 142 are prepared for user data and for metadata. For example, if the I/O request 112 specifies a write of user data, the namespace manager prepares one transaction 142 for user data, e.g. including one page for each 4-kB block of data to be written. Also, the mapper manager prepares another transaction 142 for metadata, e.g., including one page for each 4-kB block of metadata to be changed, such as indirect block pointers, block virtualization structures, and the like. As a client 140a prepares each transaction 142, it identifies the datapath elements involved in the transaction 142 and ensures that they are loaded into cache 150a, e.g., in respective pages. The node 120a then performs validation on each identified page of the transaction 142 in the cache 150a. If all the pages involved in a transaction 142 validate successfully (e.g., using checksum and/or some other validation), the client 140a may update the pages as needed to complete the write. The client 140a then commits the transaction 142 by atomically writing all of the pages of the transaction 142 and persisting them to the NV store 160.

If, however, any of the pages involved in the transaction 142 fail to validate successfully, the client 140a retries the entire transaction 142 in rescue mode. As will be described, rescue mode is a mode for accessing a datapath element that checks whether a cache page containing that datapath element is valid and, if not, attempts to replace the invalid version with a valid version that it finds elsewhere in the storage system. For example, if cache 150a attempts to access page 154-1 and discovers that page 154-1 fails validation, then rescue mode may attempt to locate a valid version of the same datapath element in some other location, which in this case may be stored in page 154-2 or in elements 154-3, 154-4, 154-5, or 154-6. Upon finding a valid version, rescue mode replaces the contents of page 154-1 with those of the valid version. The client 140a repeats this rescue-mode access for each datapath element involved in the transaction 142. Thus, if a transaction 142 includes 10 different datapath elements, the client 140a performs a rescue-mode access for each of the 10 cache pages representing those 10 datapath elements, attempting to replace any invalid cache pages with valid versions found elsewhere. The other locations that may store the valid version may include NV store 160, the persistent storage 170, or the cache 150b in node 120b, for example. Significantly, all datapath elements involved in the transaction 142 may be accessed using rescue mode, not just the one that produced the validation failure, so that all such datapath elements may be made valid and consistent prior to committing the transaction 142. If any validation errors remain after performing rescue-mode access, then the client 140a may invoke an error handler to report the error.

Although the above example pertains to a write request to node 120a, similar activities may be performed in response to read requests. Also, similar activities may be performed in response to read or write requests directed to node 120b.

FIGS. 2-5 show various methods 200, 300, 400, and 500 for managing a datapath in the environment of FIG. 1. The methods 200, 300, 400, and 500 may be performed by the nodes 120 of the data storage system 116, e.g., by the software constructs which reside in the memory 130a and/or 130b of the nodes 120 and which are run by the set of processing units 124a and/or 124b. The various acts of methods 200, 300, 400, and 500 may be ordered in any suitable way. Accordingly, embodiments may be constructed in which acts are performed in orders different from those illustrated, which may include performing some acts simultaneously.

Figure 2:
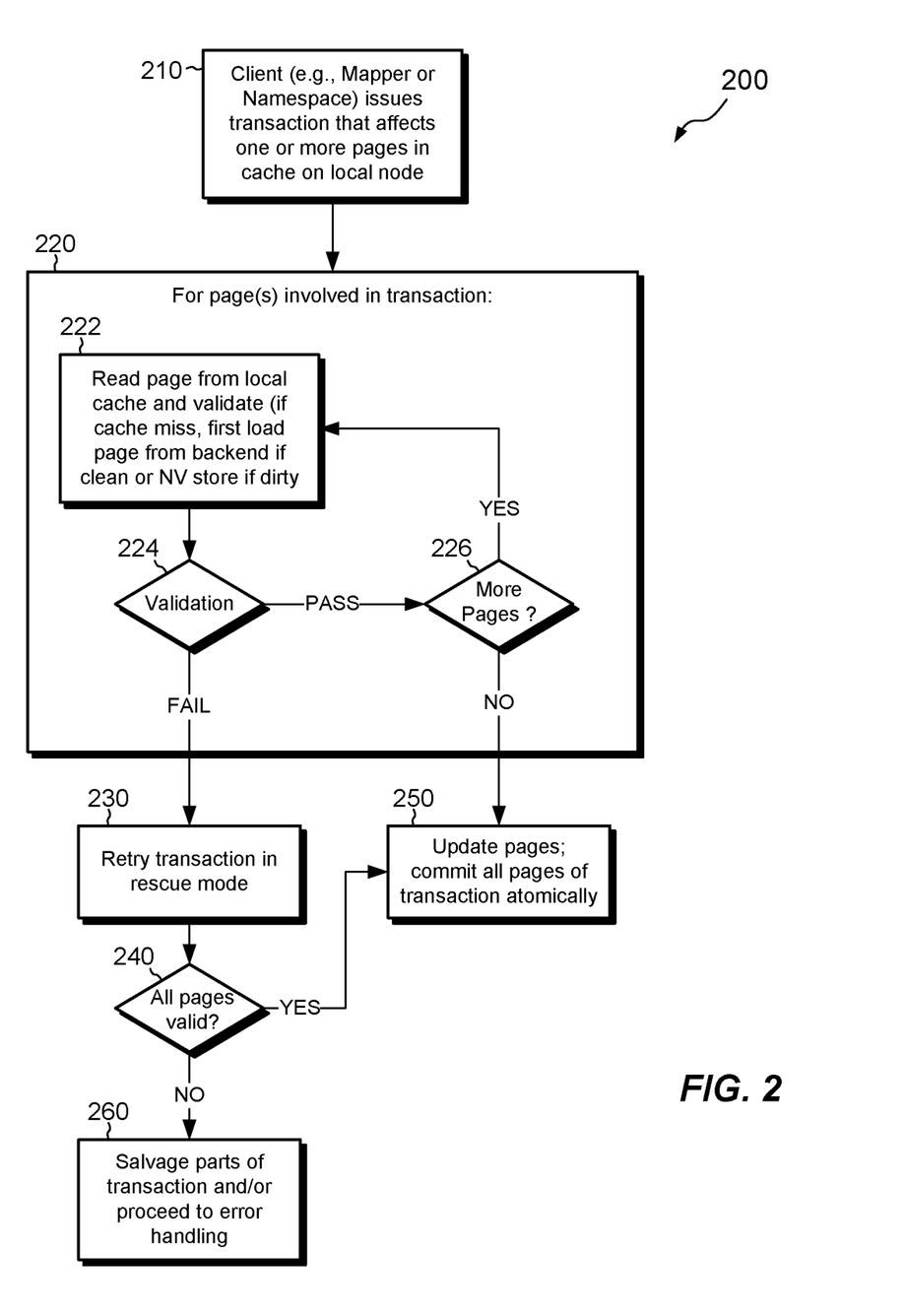
FIG. 2 is a flowchart showing an example method of managing a datapath in the environment of FIG. 1.

FIG. 2 shows example method 200 for managing a datapath in the environment of FIG. 1. At 210, a client 140a on node 120a issues a transaction 142 that affects one of more cache pages 154a that represent respective datapath elements. For purposes of this example, node 120a may be referred to as the "local" node and node 120b may be referred to as the "peer" node. This is merely for illustration, however, as the arrangement of nodes 120 may be symmetrical such that any node that receives an I/O request 112 may be local, and the other may be remote. The transaction 142 typically affects multiple pages which, for consistency, should be updated altogether at once or not at all, i.e., atomically.

At 220, validation is performed on each of the cache pages 154a involved in the transaction 142. For example, at 222 a page 154a involved in the transaction 142 is read from cache 150a and validated. If the page is not already present in cache 150a (a cache miss), the cache 150a loads the page, e.g., from persistent storage 170 if the page is clean (or not yet represented by a descriptor 152a) or from the NV store 160 if the page is dirty. Validation for user data may involve checksum validation. For example, a checksum is computed from the data in the cache page 154a and the result is compared with a checksum previously stored for that page, which may reside in the cache descriptor 152a or at some other known location. If the checksums match, validation of the user data of the page 154a passes; otherwise, validation fails. Validation of metadata typically does not involve checksums, which are too burdensome to compute for metadata, which are normally accessed much more frequently than user data. Validation of metadata may instead involve checking the page itself for a predetermined pattern, such as one that indicates what type of metadata the page contains. Validation may further involve checking the structure of the page. Validation of data or metadata may either pass or fail. If validation (at 224) of a page passes, then block 226 determines whether more pages involved in the transaction remain to be validated. If so, operation returns to 222, whereupon a next page is read and validated, in the manner described above.

If any of the pages involved in the transaction fails to validate successfully, then operation proceeds to 230, whereupon the node 120a aborts the transaction 142 and retries the entire transaction 142 in rescue mode. Examples of rescue mode will be described in connection with FIGS. 4 and 5.

At 240, if all of the pages involved in the transaction are validated successfully in rescue mode, then operation proceeds to 250. Here, the pages are updated to reflect the changes in data or metadata as needed to complete the transaction 142, and the transaction 142 is committed, e.g., by atomically writing all of the pages of the transaction 142 and persisting them to the NV store 160. However, if validation fails on any of the pages of the transaction 142 during rescue-mode access, operation proceeds to 260, whereupon the client 140a invokes error handling. As rescue mode may have corrected some errors, even though other errors may remain, the client 140a may be able to salvage certain data or metadata pages that it otherwise might be unable to salvage, resulting in a smaller scope of data unavailability than might otherwise have been achieved.

Figure 3:
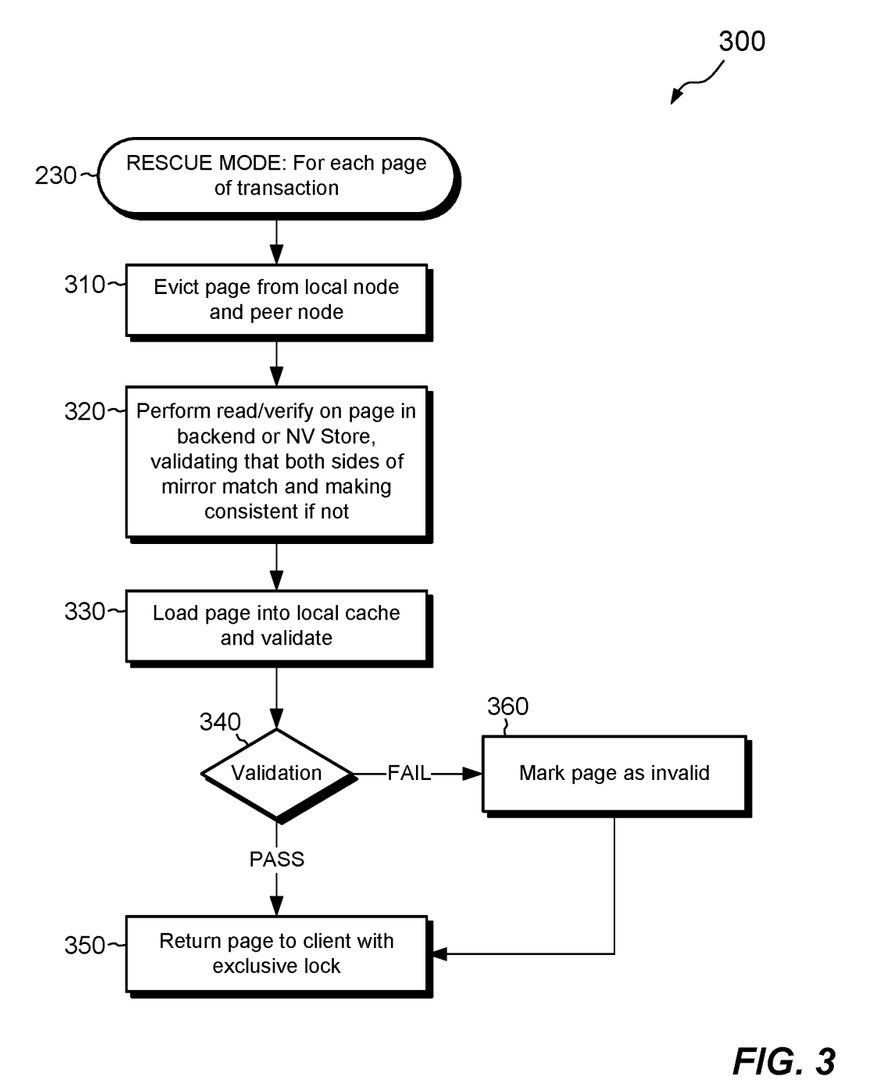
FIG. 3 is a flowchart of a first example method of accessing a datapath element of a transaction in rescue mode.

FIG. 3 shows the first example method 300 for accessing a datapath element in rescue mode. The method 300 may be performed during act 230 of FIG. 2 and repeated for each datapath element involved in the transaction 142.

At 310, a page that stores a current datapath element is evicted from cache 150a of the local node 120a. If another version of the same datapath element resides in the cache 150b on peer node 120b, that version is also evicted from cache 150b. The result of act 310 is that no page in either cache 150 contains the datapath element.

At 320, node 120a performs a read/verify of the current datapath element in the NV store 160 (if the current datapath element is stored there) or in the persistent storage 170 otherwise. A read/verify of the NV store 160 may involve independently validating the datapath element on both sides of the mirror, e.g., once for the element in NVMe 162a and once for the element in NVMe 162b. For example, node 120a performs checksum validation on both versions of the current datapath element. If the element on one side of the mirror passes checksum validation but the element on the other side of the mirror fails, then node 120a replaces the failing version with the passing version, thus synchronizing the two sides of the mirror. If the versions on both sides of the mirror pass checksum validation, then node 120a may check a generation number associated with each version. Node 120a then replaces the version having the lower generation number with the version having the higher generation number, thus synchronizing the mirror with the more recent version of the datapath element. If the current datapath element is not stored in the NV store 160, then node 120a may perform similar operations on mirrored versions stored in persistent storage 170, synchronizing those elements in a similar way.

At 330, node 120a loads the datapath element from the NV store 160 or form persistent storage 170 into a cache page 154a and performs validation on the cache page 154a, e.g., using checksum validation, pattern matching, or any other suitable method.

At 340, if validation passes, operation proceeds to 350, whereupon the cache 150a returns the page 154a containing the validated datapath element to the client 140a. The cache 150a may return the page with an exclusive lock, which prevents other accesses to the page and preserves the page's integrity. If validation at 340 fails, however, the page may be marked as invalid at 360. The page is then returned to the client 140a at 350, again with an exclusive lock. The method 300 may be repeated for each of the datapath elements of the transaction 142.

It is thus evident that rescue mode succeeds in synchronizing various versions of the same datapath element among the various locations where it may reside. It also provides each location a valid version of the element, which in many cases is also the most current version.

Figure 4:
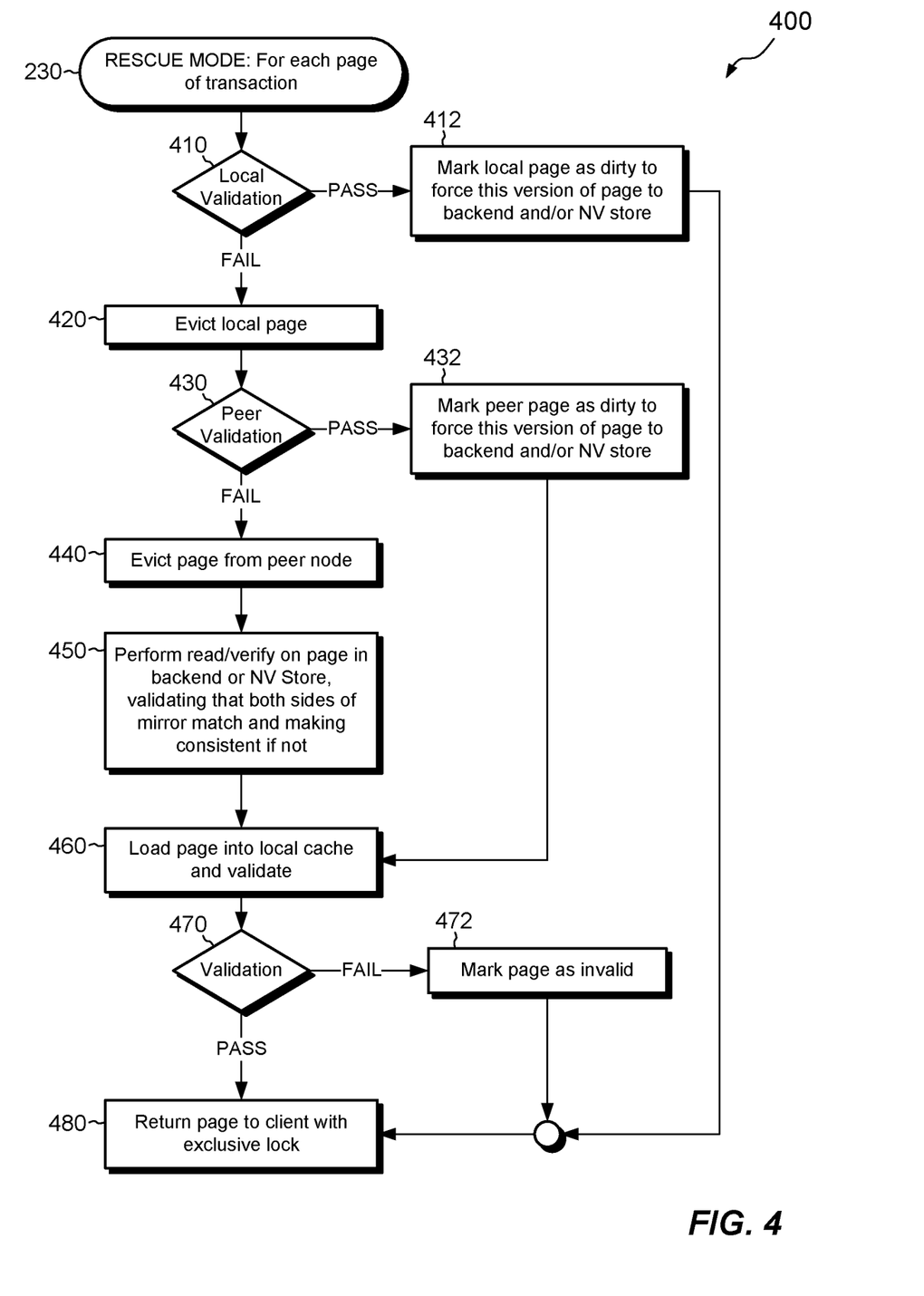
FIG. 4 is a flowchart of a second example method of accessing a datapath element of a transaction in rescue mode.

FIG. 4 shows the second example method 400 for accessing a datapath element in rescue mode. The method 400 may also be performed during act 230 of FIG. 2 and repeated for each datapath element involved in the transaction 142. Method 400 is similar to method 300, except that method 400 recognizes the possibility that the most recent valid version of a datapath element may reside in the cache 150b of the peer node 120b. For example, versions of the datapath element stored in cache 150a and in the NV store 160 or in persistent storage 170 may be old and/or invalid.

At 410, node 120a performs validation on a page 154a that stores the current datapath element. Validation may proceed using a checksum, pattern matching, or any other suitable method. If validation at 410 passes, the page 154a is marked as dirty in the associated descriptor 152a (act 412). Marking the page as dirty has the effect of copying the page to the NV store 160 (both sides of the mirror) and causing the version stored in the page 154a to supersede any other version of the same datapath element stored in cache 150b on node 120b. Operation then proceeds to 480, whereupon the page is returned to the client 140a with an exclusive lock, similar to what was done during act 350 of method 300.

If validation fails at 410, however, operation proceeds to 420, whereupon the page 154a that stores the current datapath element is evicted from cache 150a.

At 430, a corresponding page 154b on the peer node 120b is validated. This page 154b contains another version of the current datapath element. If validation of the page 154b on the peer node 120b passes, operation proceeds to 432, whereupon the page 154b on the peer node 120b is marked as dirty, causing the page 154b to be copied to the NV store 160 (both sides of the mirror).

If validation of the page 154b on the peer node 120b fails, however, operation proceeds to 440, whereupon the page 154b is evicted from the peer node 120b.

At 450, node 120a performs a read/verify of the versions of the current datapath element in the NV store 160, e.g., in the same manner as described in connection with act 320 of method 300.

At 460, node 120a loads the current datapath element into a cache page 154a and performs validation on the cache page 154a. At 470, if validation passes, operation proceeds to 480, where the page 154a is returned to the client 140a with an exclusive lock. If validation at 470 fails, however, operation first proceeds to 472, where the page 154a is marked as invalid, and then proceeds to 480, where the page 154a is returned to the client 140a with an exclusive lock.

Figure 5:
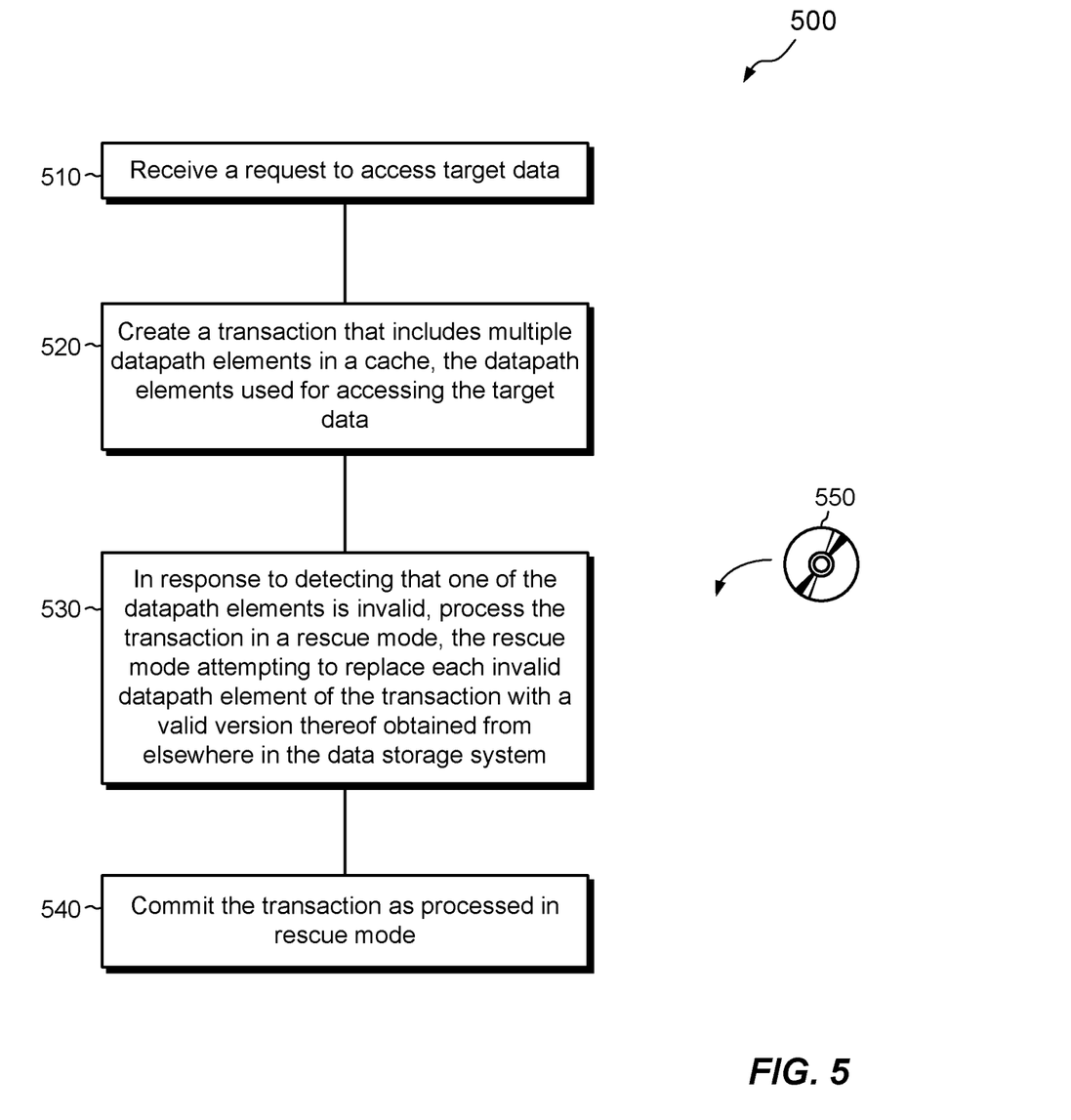
FIG. 5 is a flowchart of an example method of managing a datapath of a data storage system.

FIG. 5 shows example method 500 of managing a datapath in a data storage system. The method 500 also provides an overview of features already described above.

At 510, the data storage system 116 receives a request to access target data. For example, the request takes the form of an I/O request 112 that specifies a read or write of target data. The target data may include a portion of a LUN, a portion of a file, or any other user data.

At 520, the data storage system 116 creates a transaction that includes multiple datapath elements in a cache, where the datapath elements are used for accessing the target data. For example, a transaction 142 may include multiple datapath elements that are needed for accessing the target data. In the case of user data, the datapath elements may include cached versions of multiple data blocks of the target data, which are stored in pages 154a of the cache 150a. In the case of metadata, the datapath elements may include cached versions of metadata blocks needed for accessing the target data, such as blocks containing indirect pointer arrays, block virtualization structures, and the like, which the data storage system 116 traverses in order to locate the target data. Such metadata blocks may also be stored in pages 154a of the cache 150a.

At 530, in response to detecting that one of the datapath elements is invalid, the transaction is processed in a rescue mode. The rescue mode attempts to replace each invalid datapath element of the transaction with a valid version thereof obtained from elsewhere in the data storage system. For example, if any of the pages 154a containing cached versions of the datapath elements of the transaction 142 are found to be invalid, the entire transaction 142 is retried in rescue mode. Rescue mode attempts to find a valid version of the invalid datapath element from another location, such as the NV store 160, the persistent storage 170, or the peer node 120b, and to replace the invalid version in the page 154a with the valid version. Rescue-mode access may be repeated for each datapath element of the transaction 142, regardless of whether the datapath element passes or fails validation.

At 540, the transaction, as processed in the rescue mode, is committed. For example, the transaction 142 is committed by atomically writing all of the pages 154a of the transaction 142 and persisting them to the NV store 160.

Having described certain embodiments, numerous alternative embodiments or variations can be made. For example, although embodiments have been described in connection with a data storage system having two nodes 120 configured in an active-active arrangement, embodiments are not limited to two nodes 120. Rather, embodiments may include any number of nodes, including a single node. Further, although embodiments have been described in connection with a data storage system having both an NV store 160 and persistent storage 170, other embodiments may include persistent storage 170 but no NV store 160.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing a datapath of a data storage system, the method comprising:
   receiving a request to access target data;
   creating a transaction that includes multiple datapath elements in a cache, the datapath elements used for accessing the target data;
   in response to detecting that one of the datapath elements is invalid, processing the transaction in a rescue mode, the rescue mode checking the datapath elements in the transaction for validity and attempting to replace each invalid datapath element of the transaction with a valid version thereof obtained from elsewhere in the data storage system; and
   committing the transaction as processed in the rescue mode.

2. The method of claim 1, wherein attempting to replace the invalid datapath element with a valid version includes checking for the valid version in a non-volatile store of the data storage system.

3. The method of claim 2, wherein the non-volatile store is configured as a mirror having two sides, and wherein the method further comprises checking both sides of the mirror for the valid version.

4. The method of claim 3, wherein the method further comprises, upon detecting that one side of the mirror stores the valid version but the other side of the mirror does not, updating the other side of the mirror so that it also contains the valid version.

5. The method of claim 2 wherein, upon replacing valid datapath element of the transaction with the valid version, the method further comprises marking the datapath element as dirty in the cache.

6. The method of claim 5, wherein the cache is a first cache disposed in a first processor node, the data storage system also including a second cache disposed in a second processor node, and wherein the method further comprises, upon replacing the invalid datapath element with the valid version, evicting a corresponding datapath element from the second cache.

7. The method of claim 1, wherein the cache is a first cache disposed in a first processor node, the data storage system also including a second cache disposed in a second processor node, and wherein attempting to replace the invalid datapath element with a valid version includes checking for the valid version in the second cache.

8. The method of claim 7 wherein, upon determining that the second cache contains the valid version of the datapath element, the method further comprises marking the datapath element in the second cache as dirty.

9. The method of claim 1, wherein the cache is a first cache disposed in a first processor node, the data storage system also including a second cache disposed in a second processor node, and wherein the method further comprises, upon determining that a particular datapath element of the transaction is invalid, evicting the datapath element from the first cache and evicting a corresponding datapath element from the second cache.

10. The method of claim 1, wherein processing the transaction in the rescue mode does not correct all invalid datapath elements of the transaction, and wherein the method further comprises executing an error handler to manage the uncorrected datapath elements.

11. A computerized apparatus, comprising control circuitry that includes a set of processing units coupled to memory, the control circuitry constructed and arranged to:
receive a request to access target data;
create a transaction that includes multiple datapath elements in a cache, the datapath elements used for accessing the target data;
in response to detecting that one of the datapath elements is invalid, process the transaction in a rescue mode, the rescue mode checking the datapath elements in the transaction for validity and attempting to replace each invalid datapath element of the transaction with a valid version thereof obtained from elsewhere in the data storage system; and
commit the transaction as processed in the rescue mode.

12. A computer program product including a set of non-transitory, computer-readable media having instructions which, when executed by control circuitry of a computerized apparatus, cause the computerized apparatus to perform a method of managing a datapath, the method comprising:
receiving a request to access target data;
creating a transaction that includes multiple datapath elements in a cache, the datapath elements used for accessing the target data;
in response to detecting that one of the datapath elements is invalid, processing the transaction in a rescue mode, the rescue mode checking the datapath elements in the transaction for validity and attempting to replace each invalid datapath element of the transaction with a valid version thereof obtained from elsewhere in the data storage system; and
committing the transaction as processed in the rescue mode.

13. The computer program product of claim 12, wherein attempting to replace the invalid datapath element with a valid version includes checking for the valid version in a non-volatile store of the data storage system.

14. The computer program product of claim 13, wherein the non-volatile store is configured as a mirror having two sides, and wherein the method further comprises checking both sides of the mirror for the valid version.

15. The computer program product of claim 14, wherein the method further comprises, upon detecting that one side of the mirror stores the valid version but the other side of the mirror does not, updating the other side of the mirror so that it also contains the valid version.

16. The computer program product of claim 13 wherein, upon replacing valid datapath element of the transaction with the valid version, the method further comprises marking the datapath element as dirty in the cache.

17. The computer program product of claim 16, wherein the cache is a first cache disposed in a first processor node, the data storage system also including a second cache disposed in a second processor node, and wherein the method further comprises, upon replacing the invalid datapath element with the valid version, evicting a corresponding datapath element from the second cache.

18. The computer program product of claim 12, wherein the cache is a first cache disposed in a first processor node, the data storage system also including a second cache disposed in a second processor node, and wherein attempting to replace the invalid datapath element with a valid version includes checking for the valid version in the second cache.

19. The computer program product of claim 18 wherein, upon determining that the second cache contains the valid version of the datapath element, the method further comprises marking the datapath element in the second cache as dirty.

20. The computer program product of claim 12, wherein the cache is a first cache disposed in a first processor node, the data storage system also including a second cache disposed in a second processor node, and wherein the method further comprises, upon determining that a particular datapath element of the transaction is invalid, evicting the datapath element from the first cache and evicting a corresponding datapath element from the second cache.

* * * * *